United States Patent
Chang et al.

(10) Patent No.: US 9,429,715 B2
(45) Date of Patent: Aug. 30, 2016

(54) OPTICAL CONNECTOR

(71) Applicant: HON HAI PRECISION INDUSTRY CO., LTD., New Taipei (TW)

(72) Inventors: Chun-Yi Chang, New Taipei (TW); Jia-Hau Liu, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 34 days.

(21) Appl. No.: 14/141,368

(22) Filed: Dec. 26, 2013

(65) Prior Publication Data
US 2014/0178012 A1 Jun. 26, 2014

(30) Foreign Application Priority Data
Dec. 26, 2012 (TW) .............................. 101150085 A

(51) Int. Cl.
*G02B 6/42* (2006.01)
*G02B 6/38* (2006.01)
*G02B 6/32* (2006.01)

(52) U.S. Cl.
CPC ............. *G02B 6/3853* (2013.01); *G02B 6/425* (2013.01); *G02B 6/4214* (2013.01); *G02B 6/32* (2013.01); *G02B 6/4204* (2013.01); *G02B 6/4292* (2013.01)

(58) Field of Classification Search
CPC  G02B 6/4214; G02B 6/4204; G02B 6/4292; G02B 6/32; G02B 6/3853; G02B 6/3885; G02B 6/4249; G02B 6/2476
See application file for complete search history.

(56) References Cited

U.S. PATENT DOCUMENTS

| | | | |
|---|---|---|---|
| 5,333,225 A | * | 7/1994 | Jacobowitz et al. ............ 385/93 |
| 5,748,822 A | * | 5/1998 | Miura .................. G02B 6/3803 385/49 |
| 6,340,251 B1 | * | 1/2002 | Shibuya et al. ................ 385/89 |
| 7,850,373 B2 | | 12/2010 | Ishigami |
| 8,641,296 B2 | | 2/2014 | Nishimura |

(Continued)

FOREIGN PATENT DOCUMENTS

| | | |
|---|---|---|
| CN | 101794005 A | 8/2010 |
| CN | 102023347 A | 4/2011 |

(Continued)

*Primary Examiner* — Ryan Lepisto
*Assistant Examiner* — Mary A El Shammaa
(74) *Attorney, Agent, or Firm* — Wei Te Chung; Ming Chieh Chang

(57) ABSTRACT

An optical connector (1) for transferring light sent by fibers (2) and comprises a resin body (10) and a plurality of first lenses (11) and second lenses (12), the resin body (10) includes a bottom surface (102), a top surface (101) opposite to the bottom surface (102), a front surface (103) connecting the top surface (101) and the bottom surface (102), a first slant surface (106) and a second slant surface (105) form an angle with the bottom surface (102), the first lenses (11) are set on the first slant surface (106), the second lenses (121) are set on the second slant surface (105), the projections of the first lenses (11) and second lenses (12) that projected on the bottom surface (102) are not aligned with each other.

3 Claims, 5 Drawing Sheets

(56) References Cited

U.S. PATENT DOCUMENTS

| | | | |
|---|---|---|---|
| 2003/0007740 A1* | 1/2003 | Sherrer | 385/65 |
| 2003/0179993 A1* | 9/2003 | Shigenaga et al. | 385/33 |
| 2004/0114866 A1* | 6/2004 | Hiramatsu | 385/39 |
| 2007/0297729 A1* | 12/2007 | Kodama et al. | 385/94 |
| 2008/0036103 A1* | 2/2008 | Ban et al. | 264/1.25 |
| 2008/0037934 A1* | 2/2008 | Daikuhara et al. | 385/33 |
| 2008/0232737 A1* | 9/2008 | Ishigami et al. | 385/14 |
| 2011/0064358 A1* | 3/2011 | Nishimura | 385/33 |
| 2012/0008899 A1* | 1/2012 | Morioka | 385/33 |
| 2012/0177327 A1* | 7/2012 | DeMeritt et al. | 385/74 |
| 2013/0266260 A1 | 10/2013 | Morioka | |
| 2014/0178011 A1* | 6/2014 | Chang et al. | 385/79 |

FOREIGN PATENT DOCUMENTS

| | | |
|---|---|---|
| CN | 102667565 | 9/2012 |
| TW | 201237488 A | 9/2012 |

* cited by examiner

OPTICAL CONNECTOR

BACKGROUND OF THE INVENTION

1. Field of the Invention

The present invention relates to an optical connector, and more particularly to an optical connector can add the number of the fibers assembled to the optical connector.

2. Description of Related Art

Chinese patent No. 102667565A issued to Enplas on Sep. 12, 2012 discloses a conventional optical connector for transferring light sent by the fibers. The optical connector includes a resin body and a plurality of lenses assembled to the resin body. The resin body includes a front wall faced the fibers and a bottom wall faced to a transfer member that transfer light to electrical signals. The lenses are set on the front wall and the bottom wall. In used, one fiber match to one lens that set on the front wall, thus the number of the fibers are limited, which not benefit to the transfer speed of the light signal.

Hence, it is desirable to provide an improved carrier to overcome the aforementioned disadvantages.

SUMMARY OF THE INVENTION

Accordingly, an object of the present invention is to provide an optical connector can add the number of the fibers that assembled to the optical connector.

According to one aspect of the present invention, An optical connector for transferring light sent by fibers and comprises a resin body and a plurality of first lenses and second lenses, the resin body includes a bottom surface, a top surface opposite to the bottom surface, a front surface connecting the top surface and the bottom surface, a first slant surface and a second slant surface form an angle with the bottom surface, the first lenses are set on the first slant surface, the second lenses are set on the second slant surface, the projections of the first lenses and second lenses that projected on the bottom surface are not aligned with each other.

Other objects, advantages and novel features of the invention will become more apparent from the following detailed description when taken in conjunction with the accompanying drawings, in which:

DETAILED DESCRIPTION OF THE INVENTION

Reference will now be made to the drawings to describe the present invention in detail.

Figure 1:
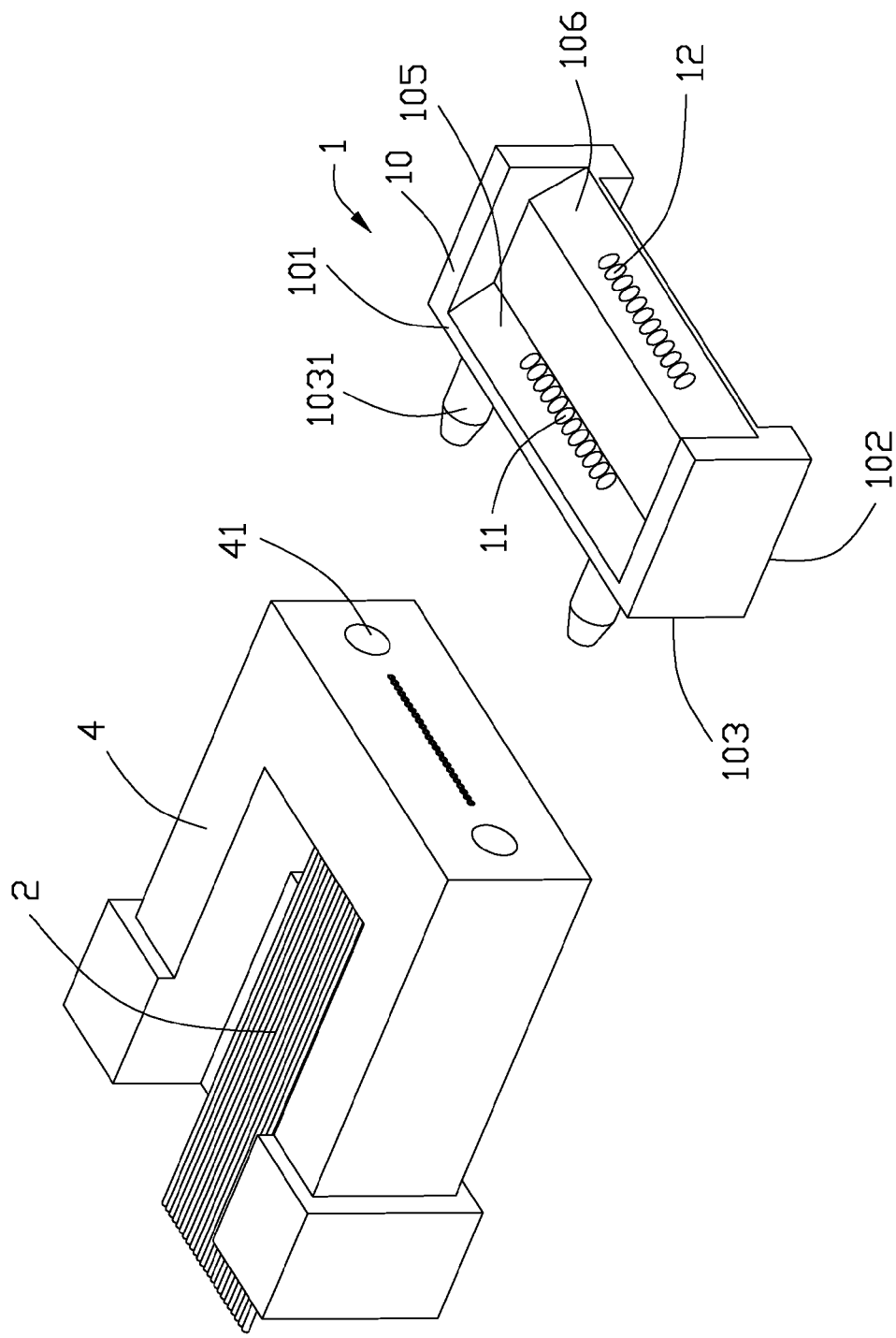
FIG. 1 is an isometric view of an optical connector according to a preferred embodiment of the present invention.
Figure 2:
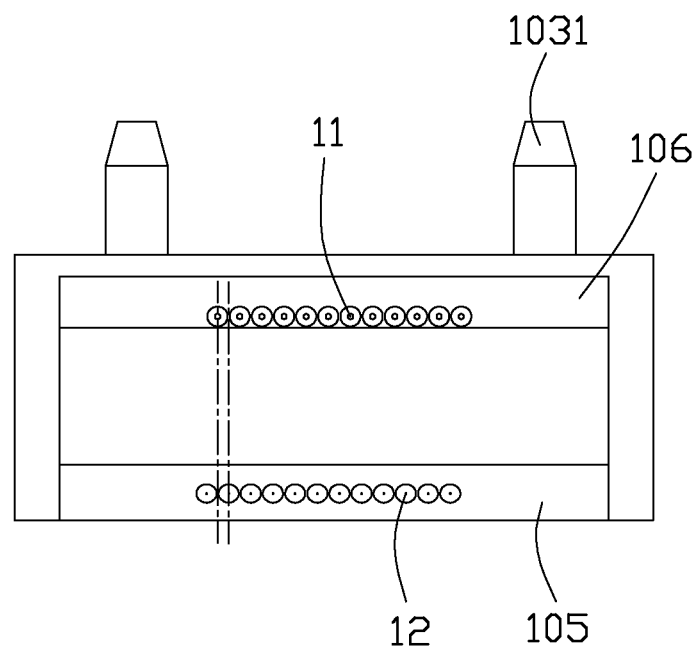
FIG. 2 is a top view of the optical connector as shown in FIG. 1.
Figure 3:
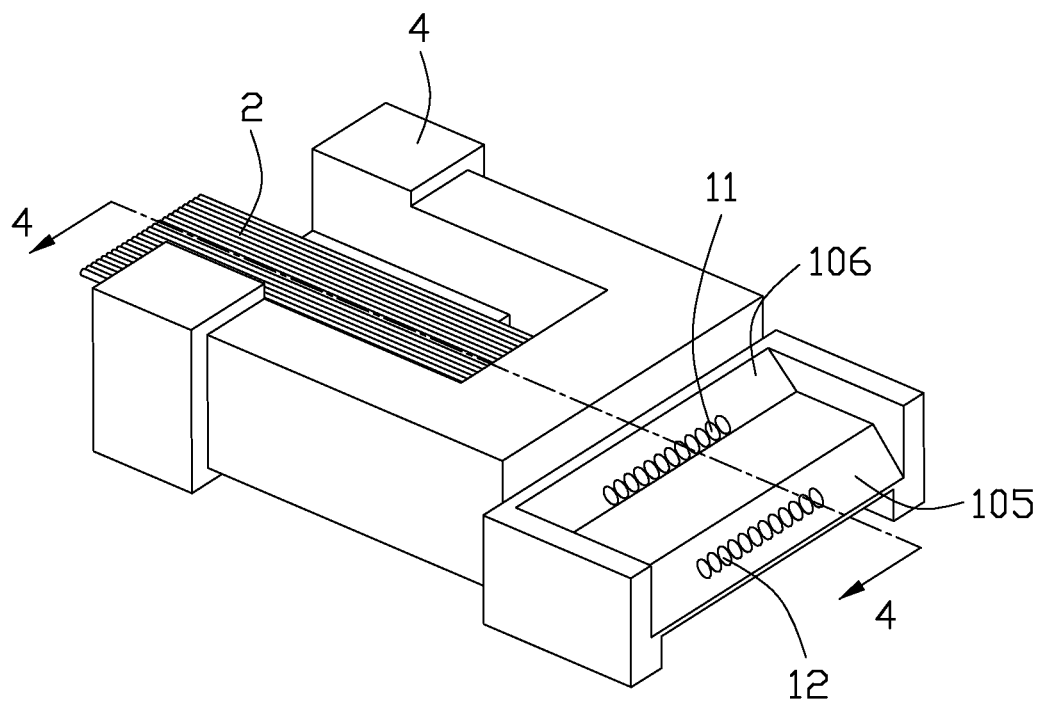
FIG. 3 is an assembled view of the optical connector and fibers.

FIGS. 1 to 3 illustrate an optical connector 1 in accordance to a preferred embodiment of the present invention. The optical connector 1 is used to transfer the light sent by fibers 2 and includes resin body 10, a row of first lenses 11 and a row of second lenses 12 set on the resin body 10. The fibers 2 are set on a seat 4. The seat 4 includes a pair of holes 41.

The resin body 10 includes a top surface 101, a bottom surface 102 paralleled with the top surface 101 and a front surface 103 connecting the top surface 101 and the bottom surface 102. The front surface 103 is vertical with the top surface 101 and the bottom surface 102. The resin body 10 further includes a first slant surface 106 and a second slant surface 105 slanted relative to the front surface 103 and the bottom surface 102. The angle formed by the first slant surface 106 with regard to the bottom surface 102 is 45 degrees while the angle formed by the second slant surface with regard to the bottom surface is different from and larger than the first angle. The row of first lenses 11 are set on the first slant surface 106. The row of second lenses 12 are set on the second slant surface 105. The fibers 2 are arrange in one row located at the same level with the row of first lenses 11 while the row of second lenses 12 is located at another level lower than the row of first lenses 11. The resin body 10 further includes a pair of post 1031 extending from the front surface 103 to match with the pair of holes 41 of the seat 4.

Referring to FIG. 2, the projections of the first lenses 11 and second lenses 12 that projected on the bottom surface 102 are not aligned with each other. The staggered distance is one half of the width of the first lens 11. Thus, the number of the fibers 2 is double added.

Figure 4:
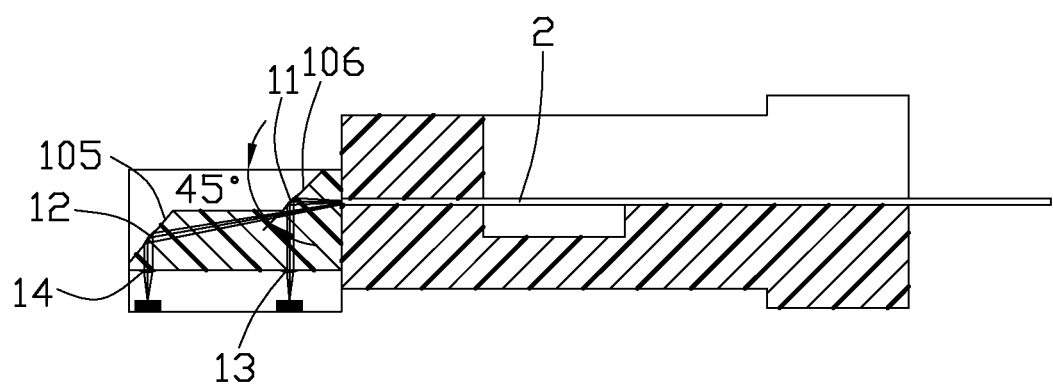
FIG. 4 is a cross-sectional view of the optical connector and the fibers as shown in FIG. 3 along line 4-4.

Referring to FIGS. 3-4, the optical connector 1 further includes a row of third lenses 13 and a row of fourth lenses 14 set on the bottom surface 102. The third lenses 13 matches with the first lenses 11 one by one. The fourth lenses 14 matches with the second lenses 12 one by one. When the optical connector 1 is assembled with the fibers 2, the pair of posts 1031 of the resin 10 being assembled to the pair of holes 41 of the seat 4, thus to make the fibers 2 contact with the resin body 10 to reduce the wastage of the light sent by the fibers 2.

Figure 5:
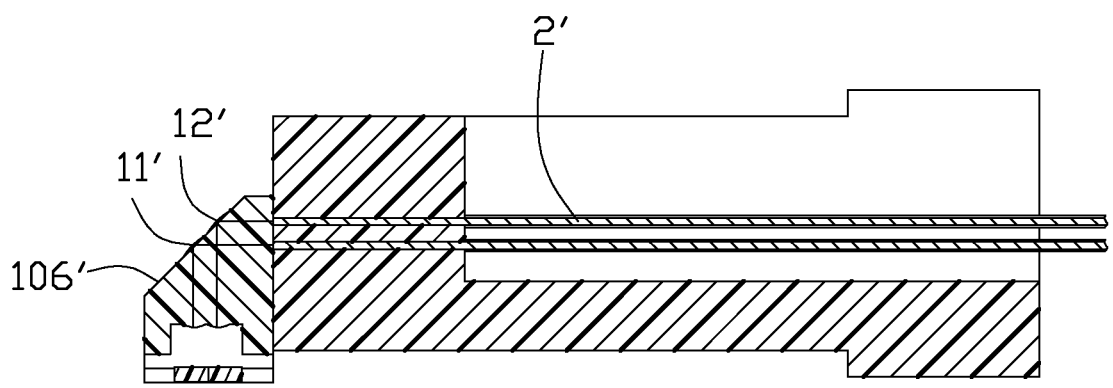
FIG. 5 is another embodiment of the optical connector.

FIG. 5 is another embodiment of the optical connector 1. The difference is the first lenses 11' and the second lenses 12' are set on one same slant surface 106', the fibers 2' are set in two rows corresponding to the first lenses 11' and the second lenses 12'.

While the preferred embodiments in accordance with the present invention has been shown and described, equivalent modifications and changes known to persons skilled in the art according to the spirit of the present invention are considered within the scope of the present invention as defined in the appended claims.

What is claimed is:

1. An optical connector comprising:
   a seat equipped with at least one row of optical fibers in a transverse direction;
   a resin body located in front of and assembled to the seat in a front-to-back direction perpendicular to said transverse direction;
   one row of first lenses located on the resin at a first level in a vertical direction perpendicular to both said transverse direction and said front-to-back direction; and
   one row of second lenses located on the resin at a second level in the vertical direction different from said first level, both said first lens and said second lenses being optically coupled with the optical fibers, respectively; wherein
   a light path reflected by the first lens is opposite to that by the second lens; wherein
   there is only one row of optical fibers, and said row of optical fibers is located at the first level; wherein a pitch of the optical fibers is one half of that of the row of first lenses and that of the row of second lenses.

2. An optical connector for transferring light sent by fibers, comprising:
- a resin body including a bottom surface, a top surface opposite to the bottom surface, a front surface connecting the top surface and the bottom surface, a first slant surface and a second slant surface both oblique to the bottom surface;
- a row of first lenses set on the first slant surface of the resin body;
- a row of second lenses set on the second slant surface of the resin body; and
- a seat assembled with the resin body and including a plurality of fibers assembled thereon; wherein
- projections of the first lenses and second lenses that are projected on the bottom surface are not aligned with each other; wherein
- the first slant surface forms a first angle with regard to the bottom surface, the second slant surface forms a second angle with regard to the bottom surface, said second angle being different from the first angle;
- wherein the fibers are arranged in one row which is located at a same level with the row of first lenses.

3. An optical connector for transferring light sent by fibers, comprising:
- a resin body including a bottom surface, a top surface opposite to the bottom surface, a front surface connecting the top surface and the bottom surface, a first slant surface and a second slant surface both oblique to the bottom surface;
- a row of first lenses set on the first slant surface of the resin body;
- a row of second lenses set on the second slant surface of the resin body; and
- a seat assembled with the resin body and including a plurality of fibers assembled thereon; wherein
- projections of the first lenses and second lenses that are projected on the bottom surface are not aligned with each other; wherein
- the first slant surface forms a first angle with regard to the bottom surface, the second slant surface forms a second angle with regard to the bottom surface, said second angle being different from the first angle;
- wherein the staggered distance of the projections is one half of the width of the first lens;
- wherein the row of second lenses is located at another level lower than the row of first lenses, and said second angle is larger than the first angle.

* * * * *